(12) United States Patent
Nicholas

(10) Patent No.: US 6,212,207 B1
(45) Date of Patent: Apr. 3, 2001

(54) ROBBED BIT SIGNAL DETECTION AND COMPENSATION

(75) Inventor: Michael G. Nicholas, Wheeling, IL (US)

(73) Assignee: 3Com Corporation, Santa Clara, CA (US)

( * ) Notice: Subject to any disclaimer, the term of this patent is extended or adjusted under 35 U.S.C. 154(b) by 0 days.

(21) Appl. No.: 08/938,688

(22) Filed: Sep. 26, 1997

(51) Int. Cl.[7] ............................................. H04J 3/12
(52) U.S. Cl. ................................... 370/523; 375/243
(58) Field of Search ................................. 370/523, 207, 370/521, 525, 526, 205; 375/229, 236, 241, 243, 246, 249, 253, 262, 265, 278, 284, 285, 296, 306; 379/88.07, 100.13, 353, 357

(56) References Cited

U.S. PATENT DOCUMENTS

| 5,859,872 | * | 1/1999 | Townshend | 375/242 |
| 5,875,229 | * | 2/1999 | Eyuboglu et al. | 379/1 |
| 5,970,089 | * | 1/1999 | Alelyunas et al. | 375/222 |
| 5,986,596 | * | 11/1999 | Waldron | 341/138 |
| 5,999,109 | * | 12/1999 | Norrell et al. | 341/58 |

* cited by examiner

Primary Examiner—Dang Ton
Assistant Examiner—Phirin Sam
(74) Attorney, Agent, or Firm—McDonnell Boehnen Hulbert & Berghoff (57) ABSTRACT

Detection and compensation for periodic disturbances in sampled data such as the error introduced by robbed bit signaling (RBS) in a digital carrier system. A period of N samples, e.g., six or twelve frames, at which the periodic disturbance repeats is identified for collecting a subset of the sampled data, i.e., samples taken from a common frame. In a digital telephone network (DTN), the RBS disturbance repeats at an integer multiple of 6 frames; signaling bits A, B in a superframe (SF), or at a period of 12 frames. In an extended superframe (ESF), the RBS may repeat every 24 frames, using signaling bits A, B, C, D in one of every sixth frame. An embodiment detects the presence of the periodic robbed bit signaling disturbances in sampled data by integrating the least significant bits (lsbs) of the subset samples from a frame to determine whether in-band signaling is being performed in the frame. Thus, the octets of identified frames may be adjusted by plus or minus a half least significant bit magnitude to compensate for the error introduced by T-Carrier signaling and the like.

11 Claims, 5 Drawing Sheets

Fig. 1

TWELVE-FRAME SUPERFRAME STRUCTURE OF
DS1 SIGNAL WITH ROBBED DIGIT SIGNALING

ROBBED BIT SIGNAL DETECTION AND COMPENSATION

COPYRIGHT NOTICE

A portion of disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

A. Field of the Invention

The present invention relates to detecting and compensating for a periodic disturbance in sampled data, and more particularly to detecting in-band robbed bit signaling (RBS) in a digital carrier system for adjusting corrupted frame signals to compensate for the error introduced by robbed bit signaling.

B. Description of the Related Art

Previous implementations of analog data communications terminated in digital equipment simulate the analog codec with a $\mu$-law or A-law expansion and compression functions. The compression and expansion functions may be provided in software as a look-up table or a small section of firmware implementing the equations used for the $\mu$-law or A-law expansion and compression functions. Robbed bit signaling (RBS) is a communication signaling system used by the digital telephone network to transmit multiple frames of data over a digital carrier system. Analog encoded data such as voice and video applications sent over the public switched telephone network and terminated on a T-1, primary rate ISDN, basic rate ISDN or other digital service may encounter increased error rates in the analog modulations over transmission lines introduced by the in-band robbed bit signaling. Nevertheless, the effect of in-band robbed bit signaling on the companded data sample typically has been ignored.

Robbed bit signaling uses the least significant bit (lsb) of every six datum, byte or octet of a transmitted frame for signaling. In a typical digital carrier system applying robbed bit signaling, the channel banks insert an in-band signaling bit into the least significant bit position of the eight bit code words in every sixth frame, and thus every sixth code word actually contains only seven bit of voice or data information such that the effective of number of bits per sample is 7 $5/6^{th}$ bits instead of 8 bits. The affect upon the analog pulse code modulated (PCM) data sent over the public switched telephone network results in the introduction of a periodic disturbance in the sampled data. Depending upon the exact signaling in use, once a call is established the affected insignificant bits are typically set to either a binary one or zero consistently, but it is also possible that the digital carrier system may alternate the robbed bits between zeros and ones. Moreover, since multiple network switches may be used in a communications path which is not superframe aligned with each other, there may be several, e.g., 2, 3, 4, 5, or even 6, out of every 6 octets for which the least significant bit is being used for signaling. For data communications using modulations such as ITU-T V.34, this error is compounded by the need to interpolate, and then decimate the data from the 8 kHz network rate to the sample rates used in the modulation, such as 2400, 2749, 2800, 3000, 3200, or 3429 Hz. Thus, corrupted sample data may be used several times so as to compound the associated error.

Recently, a computer modem data rate of 33.6 kbps has been achieved, however, it has been observed that often the modem rate shift up to 33.6 kbps results in an increased block error rate (Bler) such that the effective data through put is lower than if the modem had stayed at a lower rate, e.g., 31.2 kbps. Moreover, it is also possible for modem communication to be terminated due to dropped calls related to disturbances associated with the errors introduced by the robbed bits in the communication channel.

It would be desirable to detect the periodic disturbance associated with in-band signaling in a digital telephone network to identify the use of robbed bit signaling, and further provide for robbed bit signal compensation to minimize the error introduced by the robbed bit signaling, which would provide the functional advantage of higher connect rates and lower bit error rates in data communications applications. The detecting and compensating for a periodic disturbance and sample data could provide a commercial advantage for customers who do not have access to ISDN services or those who would prefer to pay a lower rate for T-1 service as opposed to primary rate ISDN service. Such error compensation would also be advantageous to customers using basic rate ISDN or primary rate ISDN because it would improve the connections to others using T-1 services or situations where the telephone call is routed through an intermediate T-1 trunk in the public switched telephone network.

SUMMARY OF THE INVENTION

It is an object of the present invention to address the problems associated with disturbances introduced in sampled data to overcome the disadvantages of the prior art.

It is another object of the present invention to detect periodic disturbances in sampled data.

It is a further object of the present invention to compensate for periodic disturbances in sampled data.

It is yet another object of the present invention to provide methods and apparatus for detecting and compensating for periodic disturbances in sampled data.

It is yet another object of the present invention to provide methods and apparatus for in-band robbed bit signal detection and compensation in sampled data.

In a described embodiment, detection and compensation for periodic disturbances in sampled data such as the error introduced by in-band robbed bit signaling (RBS) in a digital carrier system is addressed. A period of N samples, e.g., six or twelve frames, at which the periodic disturbance repeats is identified for collecting a subset of the sampled date, i.e., samples taken from a common frame. In a digital telephone network (DTN), the RBS disturbance repeats at an integer multiple of 6 frames; signaling bits A, B in a superframe (SF), or at a period of 12 frames. In an extended superframe (ESF), the RBS may repeat every 24 frames, using signaling bits A, B, C, D in one of every sixth frame. The presence of the periodic robbed bit signaling disturbances is detected in the sampled data by integrating the least significant bits (lsbs) of the subset samples from a frame to determine whether in-band signaling is being performed in the frame. The robbed bit signaling detector may be embodied as several integrators and flags for statistically analyzing the least significant bit data to identify a statistically significant occurrence indicative of robbed bit signaling. The octets of identified frames may be adjusted, e.g., by a half least significant bit to compensate for the error introduced by the digital carrier system signaling.

Briefly summarized, the present invention relates to methods and apparatus for detecting and compensating for a periodic disturbance in sampled data. A period of N samples at which the periodic disturbance repeats is identified, or may be determined from the nature of the disturbance and the type of communication channel employed. A subset of sample data is collected as being represented of a series of each N sample taken from sample data. The presence of the periodic disturbance may then be detected in the subset. Where the presence of the periodic disturbance is detected, an output signal may be generated indicative of a desirable adjustment to the sampled data. Software, firmware or hardware may be used for maintaining a subset count identifying the subset when storing representative data used by a detector for identifying the presence of the periodic disturbance in the sampled data. Thus, sampled data may be adjusted accordingly to minimize or compensate for the effect of error introduced in the sampled data by the periodic disturbance.

BRIEF DESCRIPTION OF THE DRAWINGS

The foregoing and other objects, features or advantages of the present invention may be more readily appreciated by reference to the disclosure when considered in conjunction with the accompanying drawings and the detailed description of the preferred embodiments described below, in which.

DETAILED DESCRIPTION OF THE PREFERRED EMBODIMENTS

Figure 1:
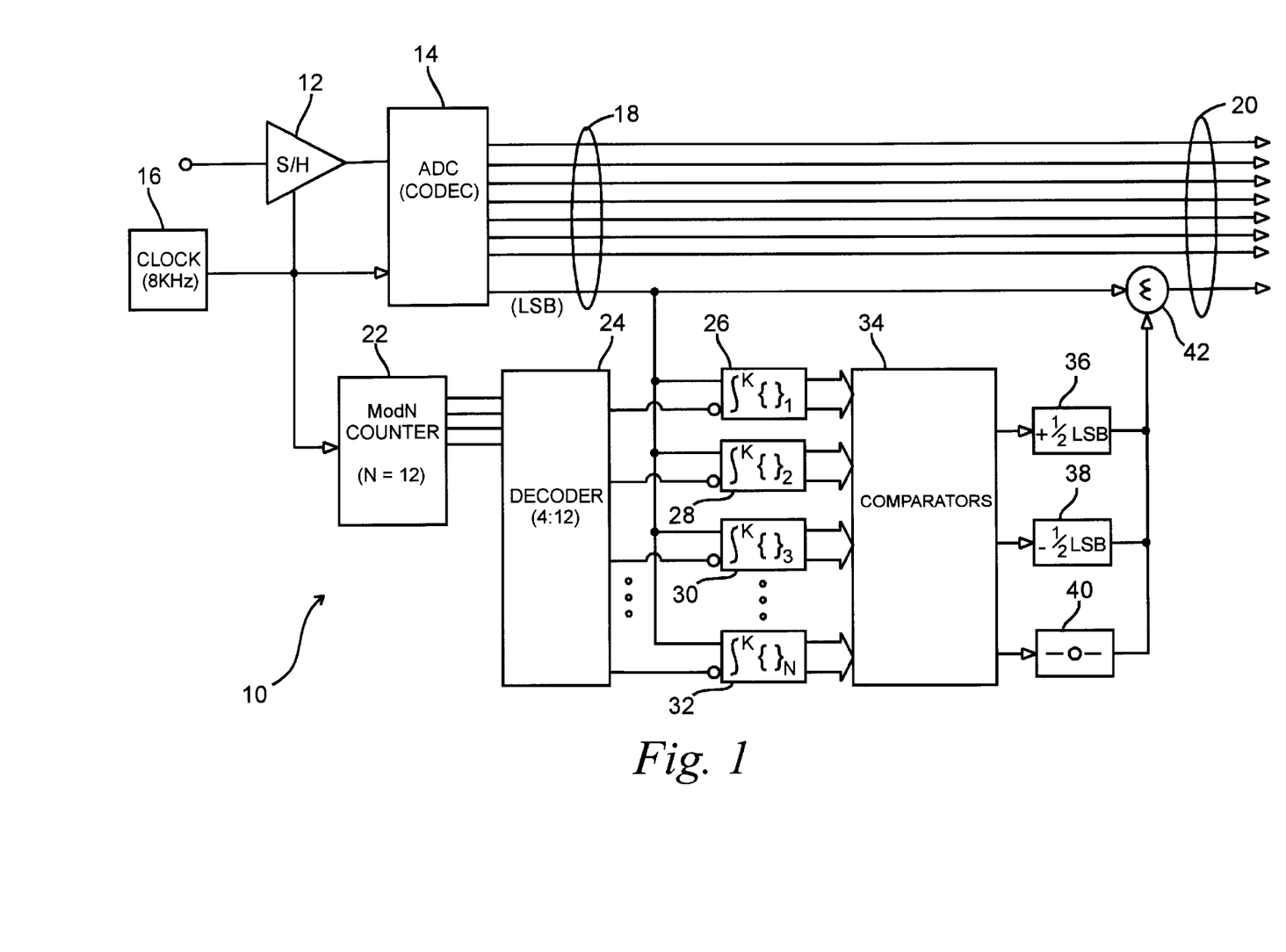
FIG. 1 illustrates a firmware and/or hardware for implementation of a robbed bit signal detection and compensation apparatus embodiment in accordance with the invention.

An apparatus 10 for detecting and compensating for a periodic disturbance in sampled data is illustrated as a firmware and/or hardware implementation for robbed bit signal detection and compensation in FIG. 1. The apparatus 10 is shown as a hardware block diagram, but it should be appreciated that an equivalent embodiment is provided for software and firmware implementations. Moreover, it should be appreciated that some of the functions provided in the block diagram in FIG. 1 may be performed in part by the digital telephone network (DTN) providing analog pulse code modulated (PCM) encoded data as the analog data communication terminated in digital equipment. A channel selector 11 presents signals from a selected time slot from the carrier system of the DTN to a sample and hold (S/H) 12 providing samples for an analog-to-digital conversion by a codec, herein ADC 14. The S/H 12 and ADC 14 are driven by a sampling clock 16, herein operating at the 8 kHz clock rate of the DTN.

Digital data samples 18 from the ADC 14, as discussed above, may include least significant bits (lsbs) which are corrupted by a periodic disturbance such as robbed bit signaling. Accordingly, the embodiment described herein adjusts the least significant bit position of the data 18 such that compensated data 20 has its least significant bit adjusted to minimize the effect of error introduced in the data by the periodic RBS disturbance. It should be appreciated that FIG. 1 illustrates a hardware or firmware apparatus for detecting and compensating for the periodic disturbance in sampled data, however, as discussed further below, an embodiment equivalent to the hardware representation of FIG. 1 may be programmed using a microprocessor or digital signal processor (DSP), such as the Texas Instruments' TMS 320 C 51 including associated memory for storing program and data, for which assembly code programming is described below. With reference to the embodiment of FIG. 1, a modulo N counter 22 is operated using the sample clock 16, wherein N equals twelve such that the 8 kHz sampling rate allows the modulo N counter 22 to count and identify the frames of a superframe, see e.g., FIG. 2 showing a 12 frame superframe structure of DS1 signal with robbed bit signaling.

Figure 2:
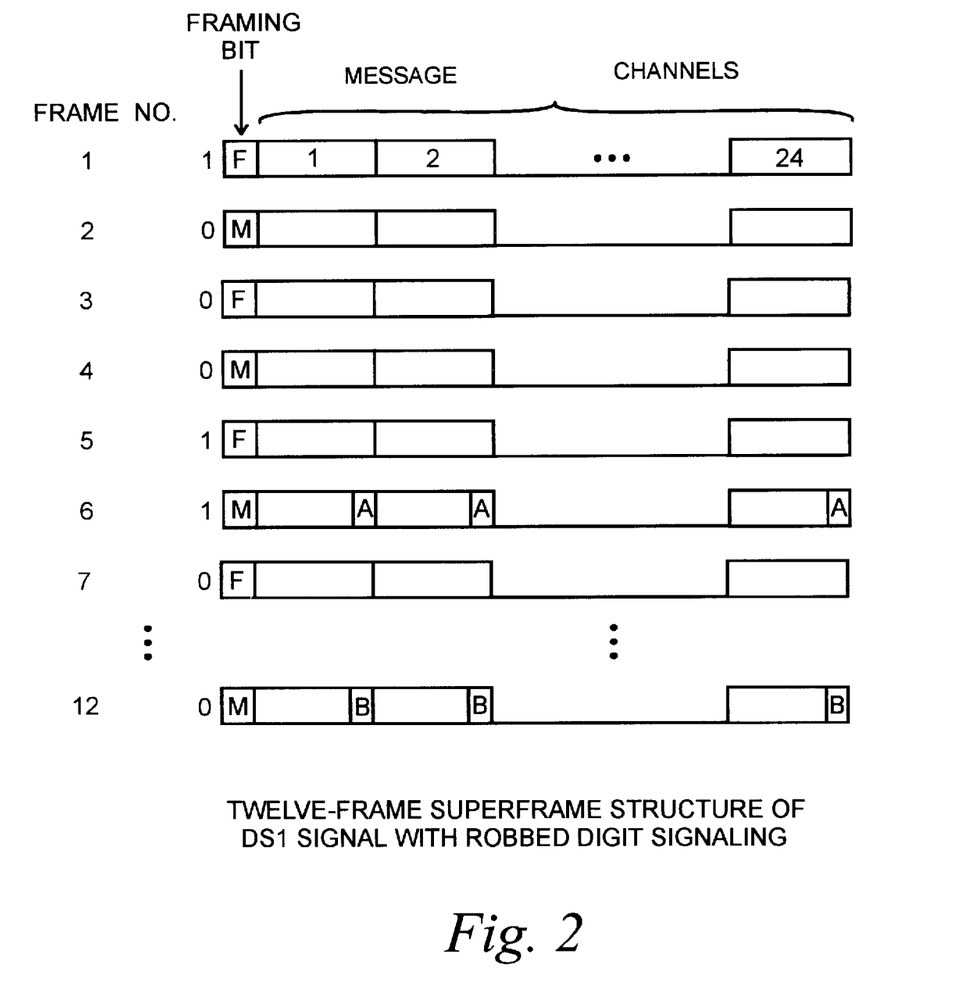
FIG. 2 depicts a twelve-frame superframe structure employing in-band robbed bit signaling which introduces the periodic disturbance in the least significant bits (lsbs) of octets transmitted over a T-Carrier system addressed in the embodiment of the FIG. 1.

With reference to FIG. 2, the twelve frame superframe structure of the DS1 signal divides the framing bits into two separate sequences, A signaling and B signaling in frame numbers 6 and 12 respectively. As discussed above, the channel banks, 24 per frame, provide 8 bits of voice or data for all time slots except every 6 frame, wherein the use of the least significant PCM bit is provided for signaling. The signaling channels thus derived are divided into the A and the B subchannels wherein the subchannels send their bits every 12 frames. Thus, the modulo 12 embodiment for counting frames in FIG. 1 using the modulo N counter 22 is provided to identify the signaling bits associated with the two signaling subchannels. The modulo N counter 22 provides a count to a decoder 24, herein 4:12, wherein each of the twelve outputs of the decoder 24 enable one of twelve integrators. Integrators 26, 28, 30, and 32 are shown to selectively, i.e., when enabled, integrate the least significant bits of the data 18 over K frames such that the output of the integrators are presented to comparators 34. The integer K is selected to be large enough to identify statistically significant indicia from the integration. The comparators 34 provide a statistically relevant threshold to determine the presence or absence of robbed bit signaling in any of the twelve frames in the embodiment to adjust a half significant bit addition at 36, half significant bit subtraction at 38, or no adjustment at 40 as signals provided to an extended resolution PCM expander 42, which converts the compensated data output 20 and which adds the adjustment to the least significant bit of the data 18 to provide for compensated data 20. The extended resolution PCM expander 42 may add additional bits, or provide an extra bit to the expanded mantissa. Thus, this embodiment reduces the error by first determining which of the six or twelve positions is being used for signaling, then compensating for it in the $\mu$-law or A-law algorithm by adding or subtracting a half of the least significant bit, when the RBS periodic disturbance is detected.

The described RBS detector has N integrators and N flags in the comparators for identifying RBS signaling in the frame. Herein, the embodiment uses twelve instead of six to detect the alternating case, where the substituted least significant bit alternates between binary zero and one. Every sample, a counter is incremented modulo 12 to the address the next integrator and if the least significant bit of that sample is a '1', that integrator is incremented. In the embodiment, every 2400 samples (200 for each integrator), the contents of the integrators are examined. If an integrator is 190 or greater, then the corresponding flag is set to indicate that a robbed bit of value '1' has been detected in that position. If an integrator is less than 10, then the corresponding flag is set to indicate that a robbed bit of '0' has been detected in that position. If an integrator is between 10 and 190, then the corresponding flag is cleared to indicate that no robbed bits were detected in that position.

The values of 10 and 190 represent 5% and 95% of the 200 sample in the described embodiment, but these thresholds may be modified as necessary to identify statistically relevant indicia in the collected data. Statistically, in the absence of RBS signaling, an analog signal as used in data communications would have 50% of the least significant bits as 0's and 50% as 1's. With RBS signaling in those positions, there should be either 0% 1's or 100% 1's, however, other factors such as line codings and periodic signaling using these bits, may cause deviation.

The 2400 value was chosen to be large enough to get a statistically good sample size, yet small enough to adapt quickly, but may be somewhat larger or smaller than 2400 if statistically relevant information may be observed with the smaller sample. Some of the modulations used in data communications have silence periods during training. This may cause the RBS detector to falsely detect 1's or 0's in every position. The detector needs to recover quickly after the silence periods for the next part of the training. This is also why the detector runs continuously. It will also resynchronize if there is a network slip in timing which causes the robbed bits to move to new positions.

The compensation done in the $\mu$-law or A-law conversion is well known in the art. The $\mu$-law PCM code uses 8 bits in the form S E2 E1 E0 Q3 Q2 Q1 Q0, where S is the sign bit, E2–E0 are the exponent, and Q3–Q0 are the mantissa. The $\mu$-law decompander linearizes this by using the formula

[(Q3 Q2 Q1 Q0)*2+33]*2 exp (E2 E1 E0).

Then it subtracts 33, e.g., to remove bias, and applies the sign bit. If a robbed bit causing a '0' in the least significant bit is detected, ½ of the least significant bit is added. It should be appreciated that all the bits of the $\mu$-law code are inverted, so a robbed bit of '1' causes the least significant bit to be a '0'. If a robbed bit causing a '1' in the least significant bit is detected, ½ of the least significant bit is subtracted. These are done by changing the formula to

[(Q3 Q2 Q1 1)*2+32]*2 exp (E2 E1 E0).

Then subtract 33 and apply the sign bit as discussed above. An equivalent change was made for the A-law function to effectively add or subtract a half of the least significant bit to provide the error compensation.

Figure 3:
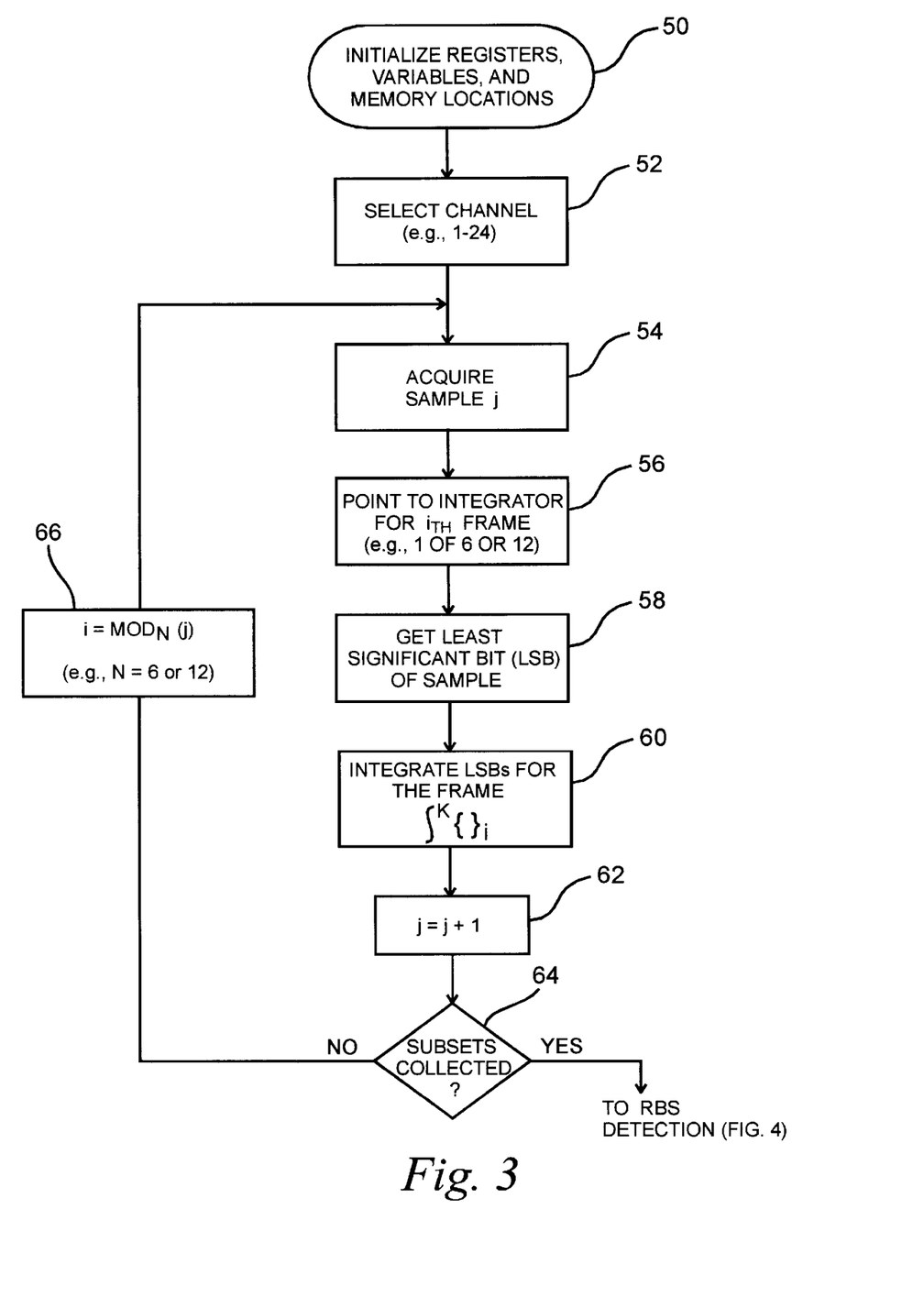
FIG. 3 is a program flow chart for the collection of sample subsets in a software embodiment.
Figure 4:
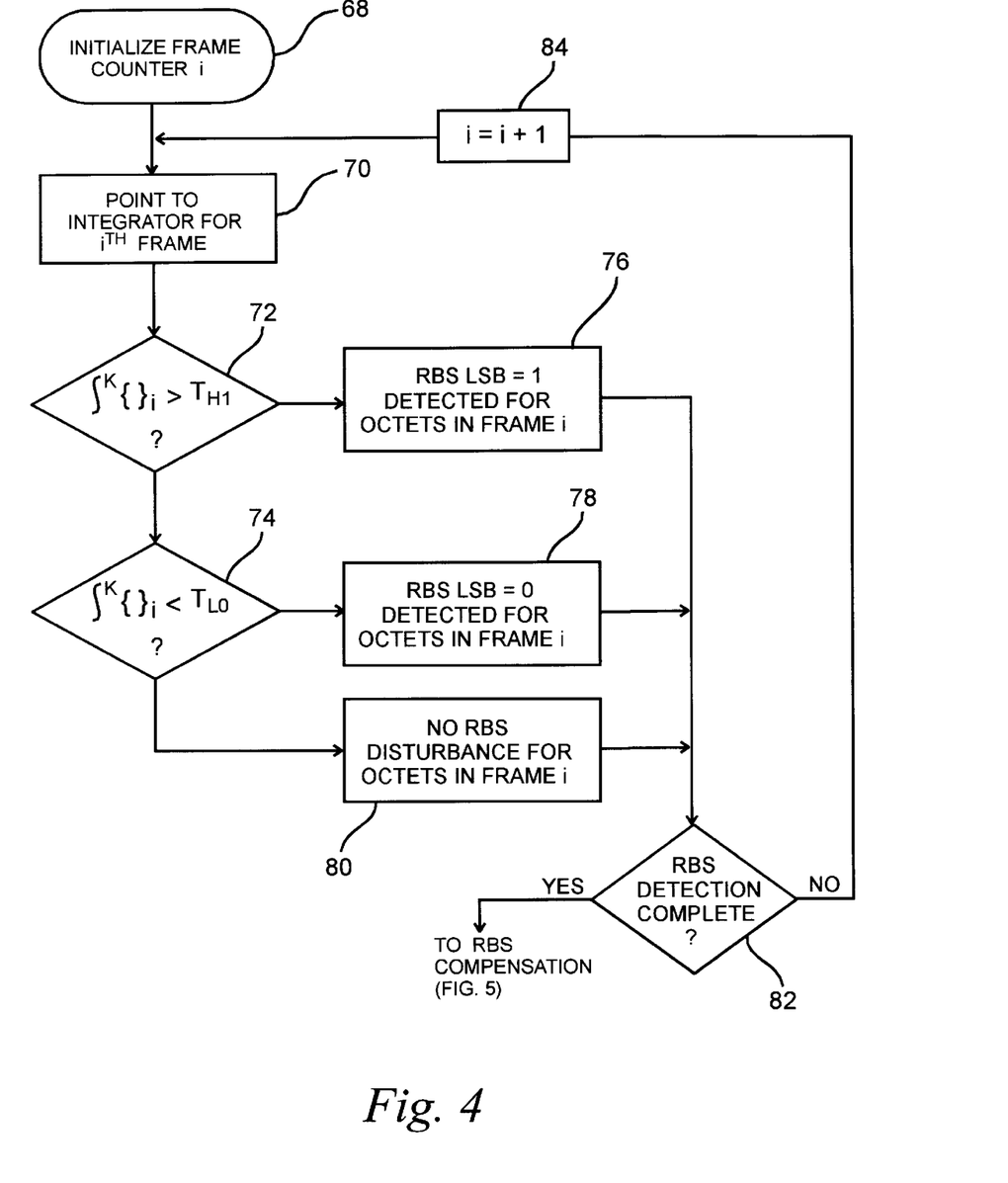
FIG. 4 is a flow chart for the robbed bit signaling detection thereof.
Figure 5:
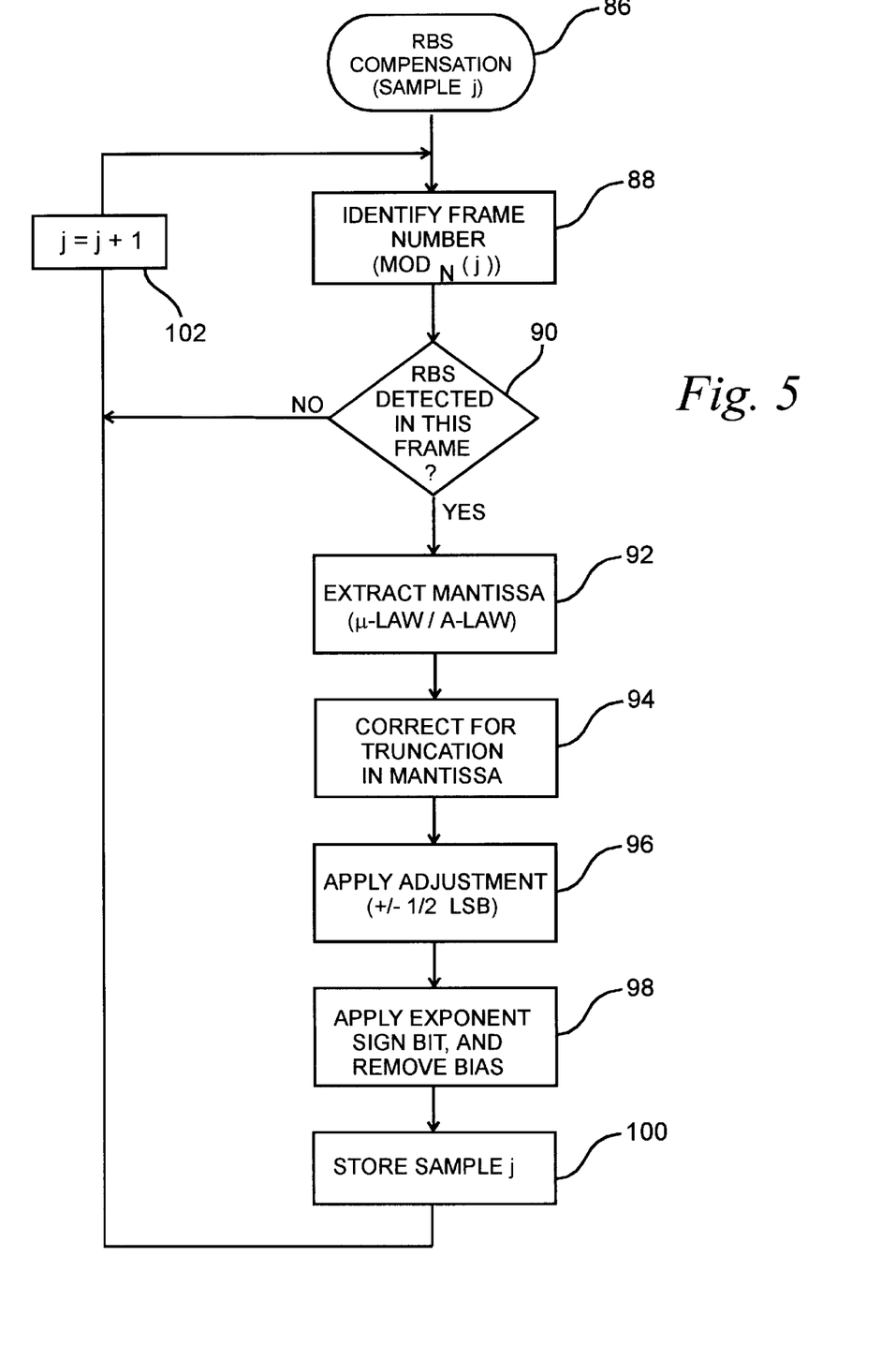
FIG. 5 is a flow chart for the robbed bit signal compensation thereof.

Turning now to FIGS. 3 through 5, and particularly FIG. 3, a program flowchart for the collection of data sample subsets in the software embodiment is shown. An initialization of registers, variables, and memory location values is performed at Step 50, and the channel is selected at Step 52, e.g., one of the 24 channels of the DS1 superframe (see, e.g., FIG. 2). A sample "j" is acquired at Step 54. Thereafter, the program index identifies the integrator for the "$i^{th}$" frame, e.g., one of either six or twelve frames. Also, at Step 56, the digital signal processor identifies a period of N as six or twelve samples at which the periodic disturbance repeats.

Then at Step 58, the least significant bit of the data sample is acquired and the least significant bits for a particular frame are integrated at Step 60. The sample counter is incremented at Step 62, and decision block 64 determines whether complete subsets have been collected for each of the frames. If the subsets have not been collected for all frames, program flow continues to block 66, wherein the frame count "i" is identified as the modulo N function of the "j" sample count, e.g., N equals 6 or 12, as discussed above. Program flow then proceeds at Step 54 to acquire the sample "j" as discussed above, and the acquisition integrate in increment steps of FIG. 3 are repeated until each of the subsets are collected at decision block 64.

When each of the subsets have been collected, Step 64 continues program flow at the robbed bit detection flow chart as depicted in FIG. 4. In FIG. 4, the frame counter "i" is again initialized for use in robbed bit detection at Step 68. Next, at Step 70 the program points to the integrator for the "$i^{th}$" frame, and the value of a least significant bit integration is obtained at Step 72 and compared to a upper threshold or compared at Step 74 to a lower threshold, as discussed above. If the least significant bit integration of Step 72 is determined to be above the upper statistical threshold, then at Step 76, the robbed bit signaling least significant bit is identified as inverting all least significant bits to a binary one for octets in the frame identified. If, however, the integration of the least significant bits at Step 74 determines that the least significant bits are below a statistically low threshold, then Step 78 identifies that the least significant bit robbed bit signaling indicates the substitution of least significant bits as being a binary zero for octets in frame "i." If, however, program flow proceeds through Steps 72 and 74 indicating no statistical significance showing a relevant periodic disturbance in the least significant bits, then Step 80 indicates that no robbed bit signaling disturbance is detected for octets in frame "i."

Program flow subsequently continues at Decision Block 82 wherein the program determines whether the robbed bit signaling detection is complete. If robbed bit signaling detection is not complete at Step 82, i.e., the remaining frames still need to be checked, then the frame counter "i" in incremented at Block 84, and program flow continues with pointing to the integrator for the next frame at Step 70. Accordingly, program flow will continue in the program loop of FIG. 4 until each of the frames have been compared for statistical relevance to ascertain the presence or absence of robbed bit signaling.

When the robbed bit signaling detection is complete at Decision Block 82, then program flow continues to the robbed bit signaling compensation at FIG. 5, wherein program flow proceeds at Step 86 by acquiring sample "j" to determine whether the least significant bit of sample "j" should be adjusted for minimizing the effect of the error introduced by the robbed bit signaling disturbance. Step 88 identifies the frame number using modulo N, e.g., 12, of the sample count "j," and then Step 90 is used to identify whether robbed bit signaling was detected for the identified frame. If robbed bit signaling was detected for the identified frame at Decision Block 90, then the adjustment to the least significant bits of octets of the identified frame is provided in the expanding, as discussed, wherein Step 92 initially extracts the mantissa according to $\mu$-law or A-law expansion. Step 94 then corrects for truncation of the mantissa. The plus or minus a half least significant bit adjustment is applied to the data sample at Step 96. To finish the expanding the exponent and sign bit are applied and the bias is removed from the sample value at Step 98. This expanded and compensated sample "j" is stored at Step 100. The program flow continues by incrementing the sample "j" count at Step 102 to identify the next incoming sample to be compensated, if necessary, for an associated RBS in the frame to determine whether the identified frame requires the compensation of the octets therein as discussed above. The robbed bit signaling compensation of the program flowchart of FIG. 5 continues in a loop selecting samples "j" commencing at Block 88 to identify the associated frame number. In the software loop, the identified sample is either adjusted in the expansion or not adjusted for robbed bit signaling as determined at Decision Block 90 and completing the software loop of FIG. 5.

There has been described software, firmware, and hardware embodiments wherein the octet data of identified frames may be adjusted by plus or minus a half the least significant bit magnitude to compensate for the error introduced by, e.g., a T-Carrier signaling system or the like such as a T1 digital carrier system. Herein, the robbed bit signal detection of compensation apparatus includes means for acquiring sample data from a communications channel carrying multiple frames of data over a digital telephone network. Each sample identified corresponds to a datum sent over the frame of the digital telephone network. Means are provided for collecting a first subset of sample data representative of a first series of a multiple of each sixth or twelfth sample from the sampled data Generating means then provide output signal indicative of an adjustment to the sampled data for compensating for the error introduced by the robbed bit signaling, as discussed above. Additionally, as discussed, multiple subsets of the sampled data representative of a series of multiple frames may be collected for comparison and/or identification of the described periodic disturbances in the sampled data.

Below is the software code of the described embodiment to detect and compensate for T1 RBS. As discussed above, the program may be carried out on a digital signal processor, herein a Texas Instruments 320 C 51 for which assembly code is shown below.

```
EQU.ASM (C51 code)
* Variables used for T1 Robbed bit detection and adjustment
rbs_cnt     .equ        Offe0h ; Master count for integrate time
rbs_pos                 .equ Offe1h ; Pointer to rbs_integrators
rbs_int     .equ        Offe2h ; length 24: 12 pairs of integrate,
adjustment
IOH8.ASM (C51 code)
...
clear       .macro addr,len
lar         arl,#:addr:
rpt         #:len:-1
sach        *+
.endm
clear       rbs_pos,26    ; clear robbed bit count, integrators, adjust
...
*       Check for Robbed bits. If found, set the corresponding RBS
adjustment.
check_rbs
splk        #2400,*+      ; integrate over 200 intervals (*12 samples)
mar         *+
*       Both u-law and A-law invert the lsb. This adjustment is
applied after
*       adding the correction for truncation in the PCM expand
routines.
*       Both are shifted by 11 at this point in the routines.
*       RBS = 1 --> code = Q3 Q2 Q1 0 1
*       xor with adjust = Q3 Q2 Q1 1 0
*       RBS = 0 --> code = Q3 Q2 Q1 1 1
*       xor with adjust = Q3 Q2 Q1 1 0
lar         ar2,#12-1
rbs_loop
lacl        *             ; get next integrator
sach        *+            ; and zero it
sach        *             ; assume no RBS adjustment
sub         #10
nop
xc          2,lt          ; if less than 5%, then RBS of 0 detected
splk        #1<<11,*      ; subtract 1/2 lsb (from inverted lsb)
sub         #180
nop
xc          2,gt          ; if more than 95%, then RBS of 1 detected
splk        #3 <<11,*     ; add 1/2 lsb (from inverted lsb)
mar         *+,ar2
banz        rbs_loop,*-,arl
ret
...
*       Robbed bit detector. Cycle through 12 positions
*       incrementing a counter every time the lsb is 1.
*       The data structure is 12 pairs of (integrator, adjustment).
bit         *,b0,arl      ; Check if lsb is 1
lar         arl,#rbs_pos  ; update RBS position index
lacl        *
samm        indx          ; 22,20,18, ...4,2,0,...
sub         #2
nop
xc          1,lt
lacl        #22
sacl        #+            ; point to current RBS integrator
mar         *0+
lacl        *
xc          1,tc          ; If lsb = 1 update RBS integrator
add         #1
sacl        *+,ar7        ; on exit, arl -> corresponding RBS adjust
bit         sysflg2,f_alaw    ; check for u_law or a_law
bcnd        expand_a_law,tc
*       u-255 or A-law PCM expansion
*       compressed code word = complement(SGN S2 S1 S0 Q3 Q2
Q1 Q0)
*       Where: SGN = 0/1 for positive/negative
*               S2 S1 S0 = 3-bit exponent
*               0 1 Q3 Q2 Q1 Q0 x x = 5-bit mantissa
expand_u_law
bit         *,b7          ; tc = sign bit
lacc        *,12,arl      ; remove PCM sample from I/O queue
cmpl                      ; invert all bits
and         #7f00h,4      ; zero sign bit and other MSB's
sach        tempx         ; save exponent
sub         tempx,16      ; zero acch
add         #33,11        ; add high bit and correct for truncation
xor         *             ; apply RBS adjustment
sach        tempy,5           ; tempy = 0 1 Q3 Q2 Q1 Q0 1
lt          tempx
bd          segz
lact        tempy
sub         #33           ; remove bias, mag = tempy ^ (S2 S1 S0) - 33
expand_a_law
bit         *,b7          ; tc = sign bit
lacc        *,12,arl      ; remove PCM sample from I/O queue
xor         #55h,12           ; invert even-order bits
and         #7fh,12           ; zero sign bit and other MSB's
sach        tempx         ; save exponent
sub         tempx,16      ; zero acch
add         one,11        ; correct for truncation
xor         *             ; apply RBS adjustment
lar         arl,tempx     ; segment number zero?
banz        segnz,*           ; no, perform normal expansion
bsar        10            ; acc = 0 0 Q3 Q2 Q1 Q0 1 0
b           segz          ; yes, don't add high bit
segnz
add         #32,11        ; add high bit
sach        tempy,5           ; tempy = 0 1 Q3 Q2 Q1 Q0 1
lt          tempx
lact        tempy
segz
xc          1,ntc         ; negate negative values
neg
sacl        tempx         ; max amplitude = ñ16062
lar         arl,#rbs_cnt  advance RBS master integrator count
lacl        *
sub         #1
sacl        *
cc          check_rbs,leq ; check RBS every 1000 intervals
*       Block any dc in the A/D sample
```

The above described half bit offset to the least significant bit of the preferred embodiments was determined based upon several examples for the preferred compensation as described herein. Additionally, the least significant bit may be adjusted any number of ways, e.g., including matching the least significant bit with the sign bit of the octet data to introduce a random changing of the least significant bit. Alternatively, the least significant bit may be scrambled, or always adjusted a predetermined amount. Several such additional examples are illustrated below for the resulting effects upon the block error rate encountered on a transmission line (Blers per minute), and the resulting signal to noise ratio (SNR).

EXAMPLE 1

Test results for T1 back to back: 1 robbed bit out of every 6 frames
Original code: No robbed bit compensation
Initial connect 31.2 k, then shift up to 33.6 k
75 Blers per minute
3780 cps throughput
43.0 SNR

EXAMPLE 2

Subtract ½ LSB (as described above) from RBS positions:
Initial connect 33.6 k
Less than 1 Bler per minute
3941 cps throughput
44.0 SNR

EXAMPLE 3

Robbed bit matches Sign bit:
Initial connect 33.6 k or 31.2 k and shift up to 33.6 k
40 Blers per minute
3880 cps throughput
43.2 SNR

EXAMPLE 4

Run scrambler on LSB of RBS positions:
Initial connect 31.2 k, then shift up to 33.6 k
120 Blers per minute
3730 cps throughput
SNR 42.9

The preferred embodiments for detecting and compensating for periodic disturbances in sample data having been described, and, more particularly, the detection of robbed bit signaling in a digital carrier system compensating for the introduced error will make numerous changes and modifications apparent to those skilled in the art that may be made to the described embodiments without departing from the true spirit and scope of the invention. Thus, it is intended that the present invention be defined by the appended claims.

What is claimed is:

1. A method of detecting and compensating for a periodic disturbance in sampled data, comprising steps of:
   identifying a period of N samples at which the periodic disturbance repeats;
   collecting a first subset of the sample data, said first subset being a representative acquisition of a first series of each $N^{th}$ sample taken from the sampled data, wherein said collecting stores data representative of the first subset of sample data, the least significant bits of the first subset of sample data, and integrates the least significant bits of the first subset of sample data;
   detecting the presence of the periodic disturbance in said first subset;
   adjusting the sample data to minimize the effect of error introduced in the sampled data by the periodic disturbance; and
   collecting a second subset of sampled data by integrating the least significant bits of the second subset of sampled data as a representative acquisition of a second series of each $N^{th}$ sample taken from the sampled data.

2. A method as recited in claim 1 wherein the sampled data is derived from a communications channel carrying multiple frames of data over a digital telephone network, each sample corresponding to a datum sent in a frame over the digital telephone network, said identifying step identifying a series of frames in which the datum may be corrupted.

3. A method as recited in claim 2 wherein the sampled data is derived from the communication channel carrying multiple frames of data over a digital carrier system, each sample corresponding to an octet sent with a frame of octets, said identifying step identifying the frames within a multiframe structure in which in-band signaling is employed by the digital telephone network.

4. A method as recited in claim 3 wherein the in-band signaling employed is robbed bit signaling, said identifying step identifying the frames of octets in which the octet least significant bits are used by the digital carrier system for signaling.

5. A method as recited in claim 4 wherein the multiframe structure is a twelve frame superframe structure in a T-Carrier digital carrier system, said identifying step identifying a period of N equals an integer multiple of six samples corresponding to a six frame robbed bit signaling series sent over the digital telephone network at which the periodic disturbance from the robbed bit signaling repeats.

6. A method as recited in claim 1 wherein said detecting step detects a statistically significant occurrence in said first subset relating to the periodic disturbance.

7. A method as recited in claim 6 wherein the periodic disturbance is introduced by in-band robbed bit signaling in a digital telephone network, said detecting step detecting a prevalent number of least significant bits of said first subset of sampled data being set to a predetermined binary value.

8. A method as recited in claim 7 wherein the prevalent number of least significant bits are set to a binary one, said adjusting steps subtracting a half of the least significant bit from the sampled data to compensate for the error introduced by the robbed bit signaling.

9. A method as recited in claim 7 wherein the prevalent number of least significant bits are set to a binary zero, said adjusting step adding a half of the least significant bit to the sample data to compensate for the error introduced by the robbed bit signaling.

10. A method as recited in claim 6 wherein the periodic disturbance is introduced by in-band robbed bit signaling in a digital telephone network, said adjusting step compensating for the error introduced by the robbed bit signaling.

11. A method as recited in claim 10 wherein digital telephone network codecs compand the sampled data as a pulse code modulated (PCM) code, said adjusting step comprising expanding the PCM code during said adjusting step.

* * * * *